J. HOWE.
THERMOMETER RECEPTACLE OR CASE.
APPLICATION FILED MAR. 29, 1910.
990,269.
Patented Apr. 25, 1911.
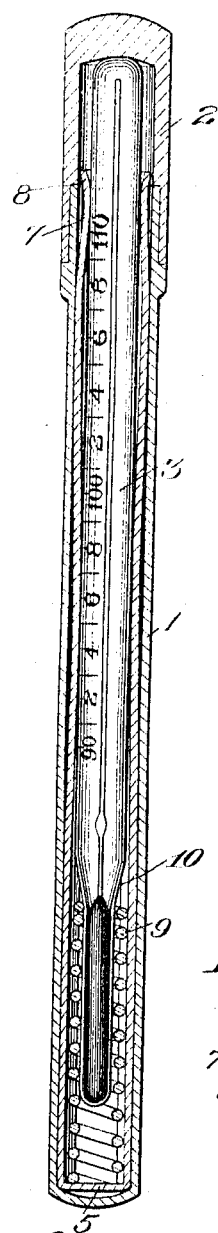
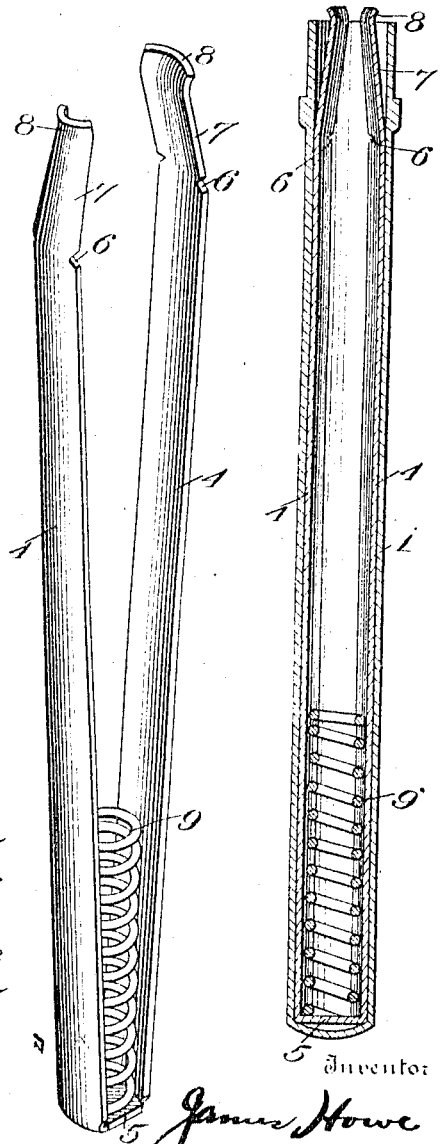
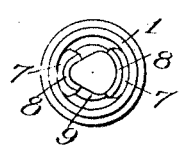

UNITED STATES PATENT OFFICE.

JAMES HOWE, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER RECEPTACLE OR CASE.

990,269. Specification of Letters Patent. Patented Apr. 25, 1911.

Application filed March 29, 1910. Serial No. 552,193.

*To all whom it may concern:*

Be it known that I, JAMES HOWE, of Rochester, in the county of Monroe and State of New York, have invented certain new and useful Improvements in Thermometer Receptacles or Cases; and I do hereby declare the following to be a full, clear, and exact description of the same, reference being had to the accompanying drawings, forming a part of this specification, and to the reference numerals marked thereon.

The present invention relates to receptacles or cases for thermometers and it has for an object to provide a construction in which the thermometer is resiliently supported within the receptacle so that vibrations will not cause the thermometer to collide with the internal walls of the casing and become broken.
To these and other ends the invention consists in certain improvements and combinations of parts all as will be hereinafter more fully described, the novel features being pointed out in the claims of the specification.

In the drawings: Figure 1 is a longitudinal sectional view of a receptacle embodying the present improvements, a thermometer being shown in position therein; Fig. 2 is a like view showing the thermometer removed; Fig. 3 is a top view of the casing of the receptacle with the cap or closure removed; Fig. 4 is a perspective view of the devices for resiliently supporting the thermometer, such parts being removed from the casing.

In the embodiment of the invention herein illustrated 1 indicates the casing which in this instance is of elongated tubular formation and open at its top, a closure or cap 2 being fitted to the open end.

For the purpose of resiliently supporting the thermometer 3 within the casing there may be employed a plurality of spring arms 4, of curved cross section, connected at their lower ends by a portion 5 forming a substantially U-shaped member, the free ends of the arms extending upwardly within the casing and projecting slightly above the open end of the latter. Preferably these arms are notched on opposite sides, as at 6, so that they may be bent inwardly to provide portions 7 arranged at obtuse angles to the lower portions, the extreme outer ends of the arms being bent or flared outwardly as at 8 to facilitate the introduction of the thermometer 3 between them.

Arranged within the casing and near the bottom thereof is a helically coiled spring 9 preferably secured only at its lower end to the connecting portion 5, its upper coil being open to receive a thermometer bulb which has a diameter less than the internal diameter of the coils so as to fit within the spring in order that the latter may engage the tapering shoulder 10 on the thermometer, thus removing the pressure from the bulb which is formed of thinner material than the stem of the thermometer. The coil, during compression, is supported against lateral movement by the arms 4.

To insert the thermometer within the casing its bulb is introduced between the projecting flared ends 8 thus separating the ends and placing them under tension, the portion of the arms below the cuts 6 bending inwardly under this action and acting as springs for the upper portions. When the bulb reaches the coil spring 9 it enters the upper end of the latter until the tapered shoulder 10 is engaged by the upper coil of the spring. The cap is then placed on the casing 1 and engages the outer end of the thermometer forcing the lower end slightly downward and placing the spring 9 under a slight compression. The thermometer is thus held against free lateral or sidewise movement by the spring arms 4 while free longitudinal movement is prevented by the spring 9 which also acts to support the thermometer at its thickened portion above the bulb. This arrangement fully protects the thermometer against accidental breaking due to vibrations within the casing.
I claim as my invention:

1. In a receptacle for thermometers, the combination with a casing open at one end, of two resilient arms extending longitudinally of the casing and projecting from the upper end thereof, said projecting ends of the arms being bent outwardly relatively to each other and curved in cross-section forming a throat exterior to the open end of the receptacle for guiding a thermometer stem when inserted between the arms and a cap for the casing inclosing the end of the thermometer and the extremities of the arms.

2. In a receptacle for thermometers, the combination with a cylindrical casing open at one end, of two connected resilient arms curved in cross section corresponding to the interior of the casing, and extending throughout the length of the casing, said arms being arranged opposite to each other, and normally set to move toward each other and having at their outer ends portions turned inwardly at obtuse angles and their extremities flared outwardly to form a funnel shaped neck adapted to receive the end of a thermometer and coöperate therewith to separate the arms, and a seat adapted to receive a thermometer bulb supported between the lower ends of the arms.

3. In a receptacle for thermometers, the combination with a casing, of a holder inserted therein comprising a strip of spring metal bent into U shape and forming two arms extending longitudinally of the casing, the outer ends of said arms projecting beyond the end of the casing, the projecting extremities of said arms being bent outwardly to form a neck adapted to receive a thermometer and a support for a thermometer bulb located between the lower ends of the arms.

4. In a receptacle for a clinical thermometer comprising a stem and a bulb of smaller dimensions at its lower end, the combination of a casing and two resilient members extending longitudinally within the casing, said arms being connected at their lower ends and adapted to embrace the stem of the thermometer, and means between the lower ends of the arms forming a seat adapted to coöperate with the smaller bulb portion of the thermometer.

5. A receptacle for thermometers comprising a long narrow casing, a closure therefor, and a helically coiled spring at the bottom of the casing, having its upper coil open to receive the thermometer bulb and supported to prevent lateral movement thereof when compressed.

JAMES HOWE.

Witnesses:
 HERBERT J. WINN,
 S. J. MERKLINGER,
 M. A. POLLARD,
 J. F. TUCKER.